Figures 1, 2:
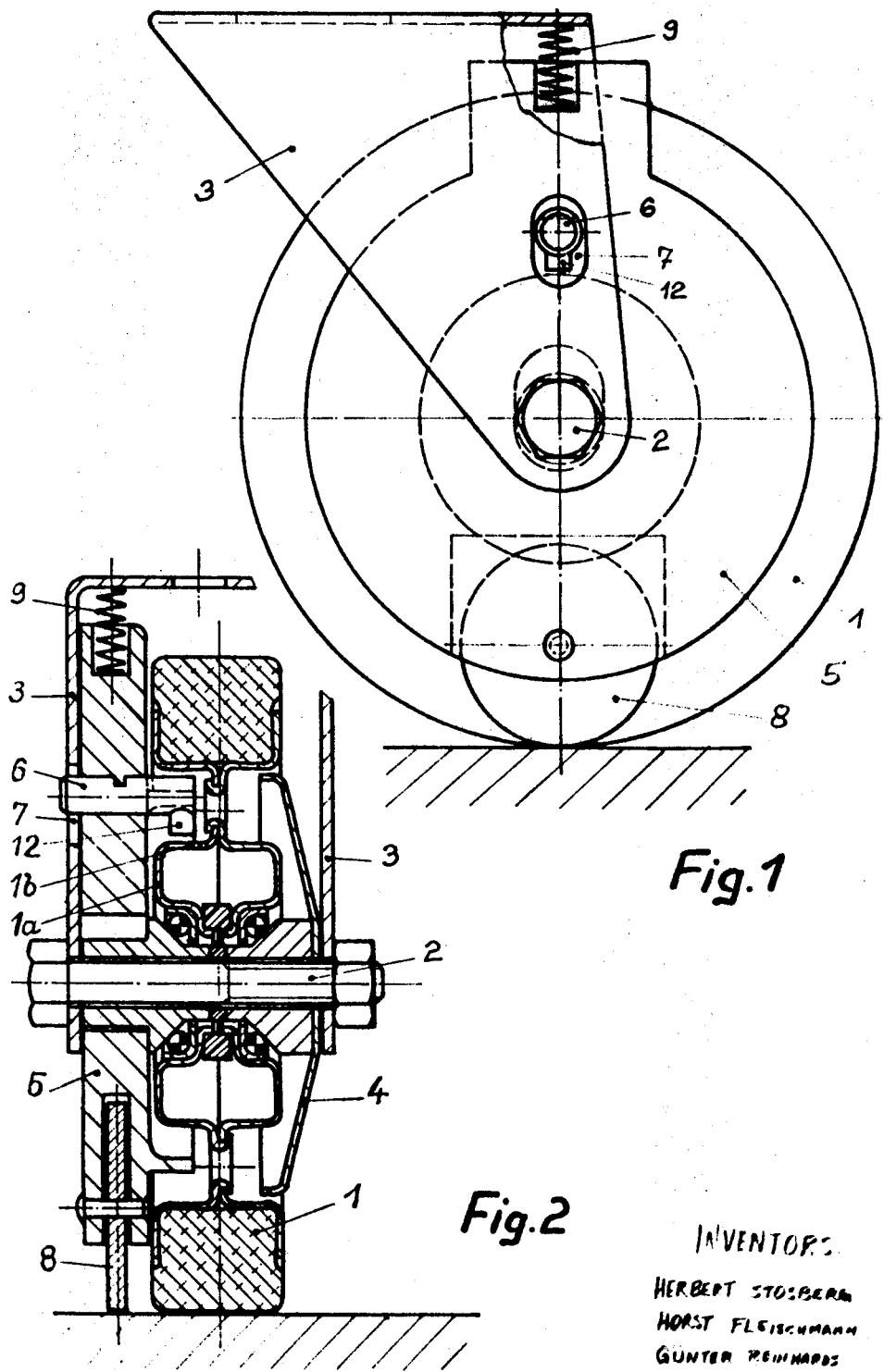

United States Patent

[11] 3,608,693

[72] Inventors Herbert Stosberg;
Horst Fleishmann; Gunter Reinhards;
Engel Siegfried, all of Wermelskirchen-
Tente/Rhineland, Germany
[21] Appl. No. 814,961
[22] Filed Apr. 10, 1969
[45] Patented Sept. 28, 1971
[73] Assignee Firm Tente-Rollen Gesellschaft mit
beschrankter Haftung Companie
Wermelskirchen-Tente am Rhineland,
Germany
[32] Priority Sept. 18, 1968
[33] Germany
[31] G 67 51 035

[54] ROLLERS, PARTICULARLY FOR SHOPPING
TROLLEYS
14 Claims, 8 Drawing Figs.
[52] U.S. Cl..................................................... 198/16,
16/35, 188/5
[51] Int. Cl........................................................ B60b 33/00
[50] Field of Search........................................... 16/35, 35
D; 188/5, 110; 198/110, 16

[56] References Cited
UNITED STATES PATENTS
3,090,470 5/1963 Abrams........................ 16/35
3,305,064 2/1967 Mullis et al. ................. 188/5

*Primary Examiner*—Bobby R. Gay
*Assistant Examiner*—Doris L. Troutman
*Attorney*—Burgess, Dinklage & Sprung ABSTRACT: A roller for a shopping trolley comprises a wheel held rotatably in a fork and having at one side a sensing member which travels over the ground surface with the wheel. When the wheel runs onto a ribbed or grooved surface the sensing member is urged down into a groove, by gravity or by a spring, and in so doing locks the wheel against rotation. The locking of the wheel may be effected by a lug which either enters an aperture in a hub rim of the wheel or engages teeth on the hub. In an alternative the wheel is formed by two wheel discs with a sensing disc situated between them. The sensing disc has a locking cam which can engage a bore in a nonrotatable bearing sleeve of the wheel discs.

INVENTORS
HERBERT STOSBERG
HORST FLEISCHMANN
GUNTER REINHARDS
SIEGFRIED ENGELS

INVENTORS:
HERBERT STOSBERG
HORST FLEISCHMANN
GÜNTER REINHARDS
SIEGFRIED ENGELS

BY
Burgess, Dinklage & Sprung
ATTORNEYS

ROLLERS, PARTICULARLY FOR SHOPPING TROLLEYS

This invention relates to a roller, preferably a roller in the form of a caster, which is intended in particular for shopping trolleys in self-service stores where the difference in level from floor to floor is overcome by escalators, or moving platforms, or inclines, which are ribbed in order that the self-service trolleys can be entrained. The invention however can also be used for industrial and other purposes, where it is important to convey inherently movable appliances on conveyor tracks ribbed for this purpose.

In order that the shopping trolleys in self-service stores can be safely entrained on such ribbed conveyor tracks or moving platforms, it is known to form the running wheels of the casters of different types arranged on the trolley with such a profile, that they can sink into the conjugately profiled track grooves in the ribbed platform or the like. In this way, supports provided on the shopping trolley come to rest on the surface of the ribbed platform and secure the shopping trolley during its entrainment on the conveying track until it reaches a ridged plate at the end of the track.

The supports provided on the shopping trolley for the automatic positioning on the ribbed conveyor track are bulky and, especially in crowds, can lead not only to damage to shoes, but in the case of children even to injury. Moreover string, debris from packaging material and such like, which might be lying on the floor, easily get caught up in them. It is known therefore, to form the running wheels of the shopping trolley in such a way that grooves situated between the runner discs of the wheels form a polygonal prism at their base, for example a pentagon, the edges of which rest on the ribbed surface of the platform when the wheels sink into the ribbed platform so as to secure the trolley in the manner represented and described in the German Gebrauchsmuster specification 1 931 792. These grooved runnings wheels, however, have a disadvantage in practice. For example dirt, small stones, cherry stones and the like get in between the disc-shaped webs of the wheels and thus render the securing action ineffective, so that the wheels can slip on the moving platform or conveyor track. This is highly dangerous since in addition to the goods purchased, small children are usually carried by the shopping trolleys which are often provided for this purpose with appropriate child seats. Moreover in the case of the grooved running wheels the contact surfaces of the discs are very narrow in relation to normal running wheels, as a result of which there is a considerably increased surface pressure. Consequently, when a shopping trolley with a heavy load, perhaps when the wire baskets of the shopping trolley are preponderantly filled with preserves or full bottles, travels over floorings with a soft sound-deadening lining, such as polyvinyl chloride, deep furrow-shaped tracks are left behind which ruin the floor covering. Because of the necessary stability of the runner discs they must consist of stable material, as a result of which the runner discs cause considerable roller noise when travelling over tiled surfaces, which are at least common locally in the food departments of departmental stores and may even be stipulated for hygienic reasons.

An object of the invention is to obviate the disadvantages of the grooved running wheels and to facilitate the use of smooth, preferably rubber-tired conventional running wheels with a reliable securing during the entrainment of the movable appliance on ribbed or grooved conveyor tracks.

The novel roller, which is preferably a caster and is intended for the entrainment or conveyance of movable appliances on ribbed conveyor tracks and in particular for shopping trolleys in self-service stores, is characterized according to the basic idea of the invention, in that it has a vertically movable sensing member which is in constant contact with the floor and, on sinking into a groove of the conveyor track, actuates a securing mechanism thus stopping the running wheel from travelling. Various means can be used to keep the vertically movable sensing member constantly in contact with the floor. It has proved advantageous to use a spring or a deadweight or its own weight to keep the vertically movable sensing member in constant contact with the ground and to cause it to sink into the recesses in the conveyor track when on the ribbed or grooved conveyor.

The sensing member can be arranged laterally to the running wheel, but it is also possible to provide the roller with a pair of running wheels and to then arrange the sensing member between the two running wheels. It is also possible to fit the sensing member to be vertically movable on the running wheel fork.

The mounting of the sensing member can be effected in various ways. The sensing member can also be arranged to be vertically movable on the running wheel axis. The sensing member can then have, as a lock against rotation thereof a check member cooperating with the running wheel fork, or can cooperate with a check member of the running wheel fork.

The securing mechanism, which on sinking of the sensing member in a groove of the ribbed or grooved conveyor track, is actuated by the vertical movement of the sensing member, can be made in any appropriate manner. In one constructionally simple and advantageous embodiment of the invention, the sensing member has a catch lug or the like, which during, and as a result of, the sinking movement of the sensing member engages in a holed rim or in teeth on the running wheel and in this way stops the wheel from travelling.

In order that the sensing member, which is kept by force or by its own weight on contact with the floor, does not cause sliding or other noises on the ground, a further development of the invention provides that the sensing member can have as a ground-sensing element a small wheel travelling along the ground, which wheel is sufficiently narrow and is so formed as to be capable of being urged into a groove of the conveyor track when running onto a ribbed or grooved conveyor track and in this way to actuate the securing mechanism.

In another development of the invention the sensing member consists of a vertically movable follower disc having a locking cam, which when the correspondingly narrow disc sinks into a groove of the conveyor track, engages in a bore or slot of the running wheel axis locked against rotation, or of a bearing sleeve locked against rotation, and in this way stops the wheel from travelling. Advantageously a spring is provided, which presses the follower disc constantly downwards and keeps it in contact with the ground as well as ensuring the penetration of the disc in a track groove on running up onto the conveyor track.

Specific embodiments of the invention will now be described by way of example with reference to the accompanying drawings, in which:

FIG. 1 is a side view of a roller with a vertically movable sensing member having as a ground-sensing element a small follower wheel, shown travelling over flat ground, FIG. 2 is a vertical section through the running wheel shown in FIG. 1 and illustrates its constructional arrangement.

Figure 3:
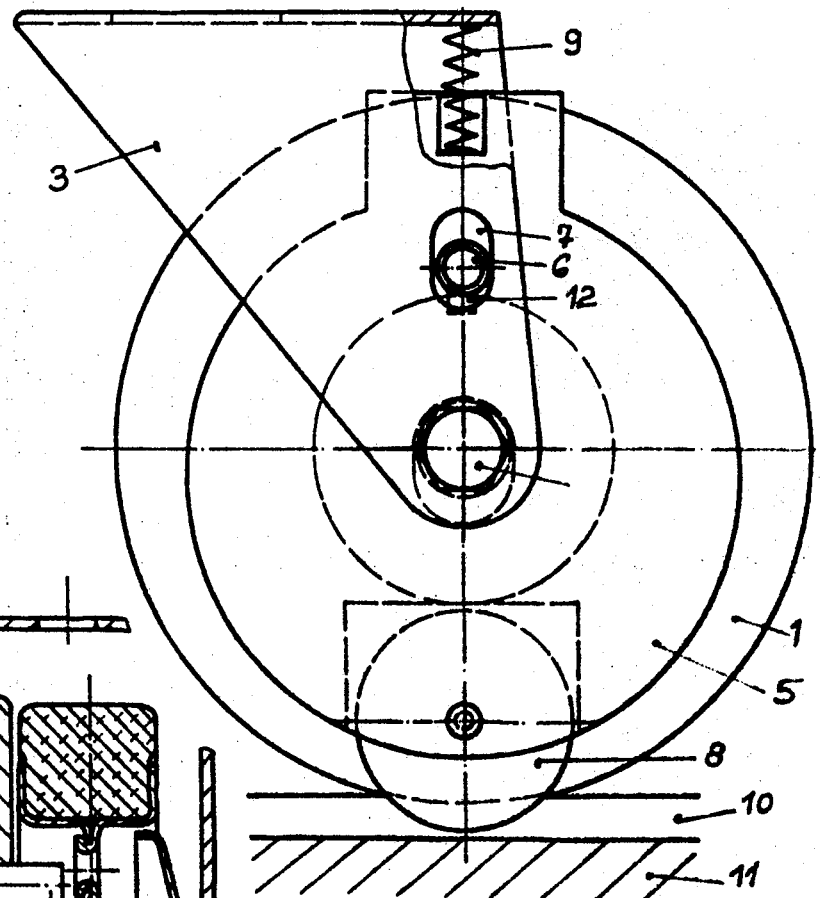
Figure 4:
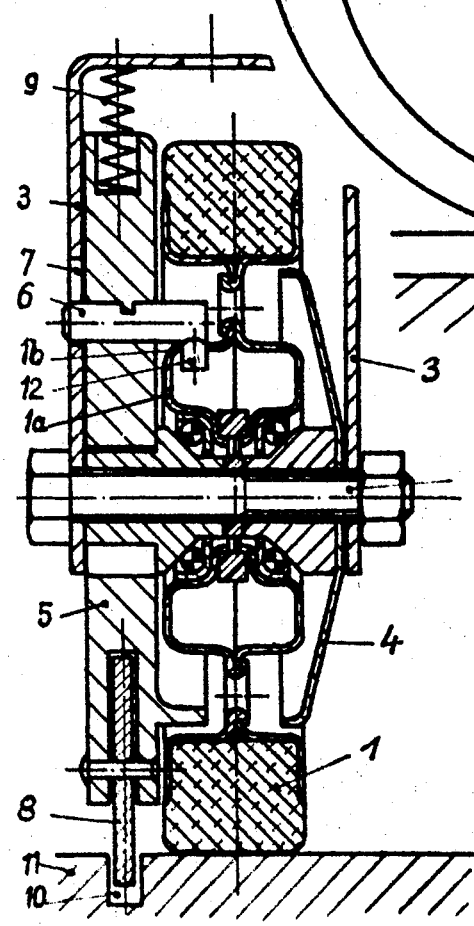
Figure 5:
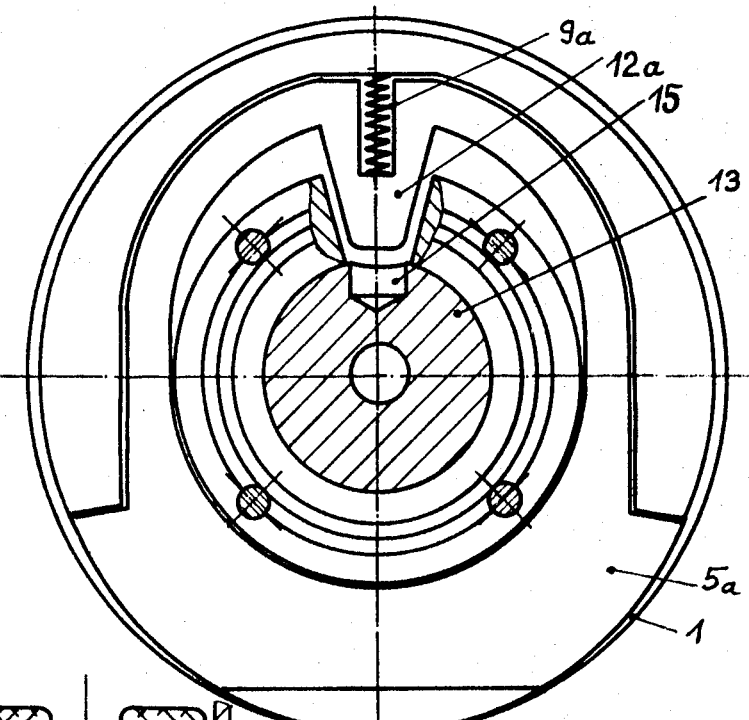
Figure 6:
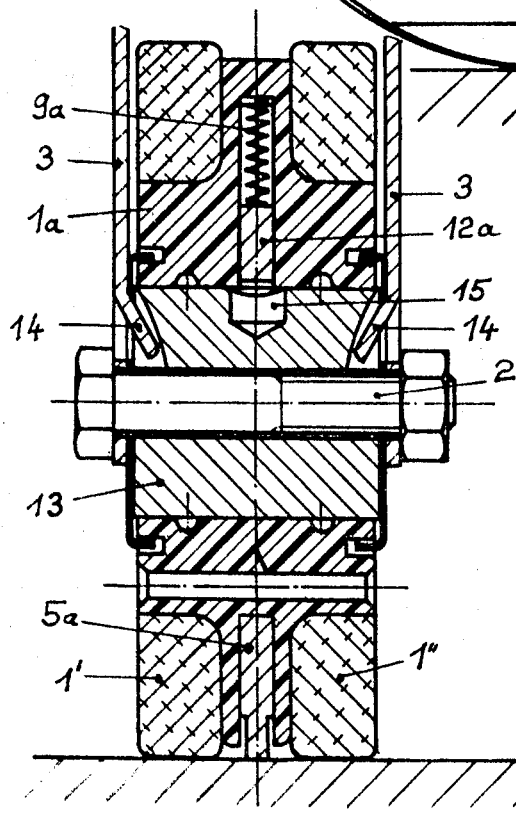
Figures 7, 8:
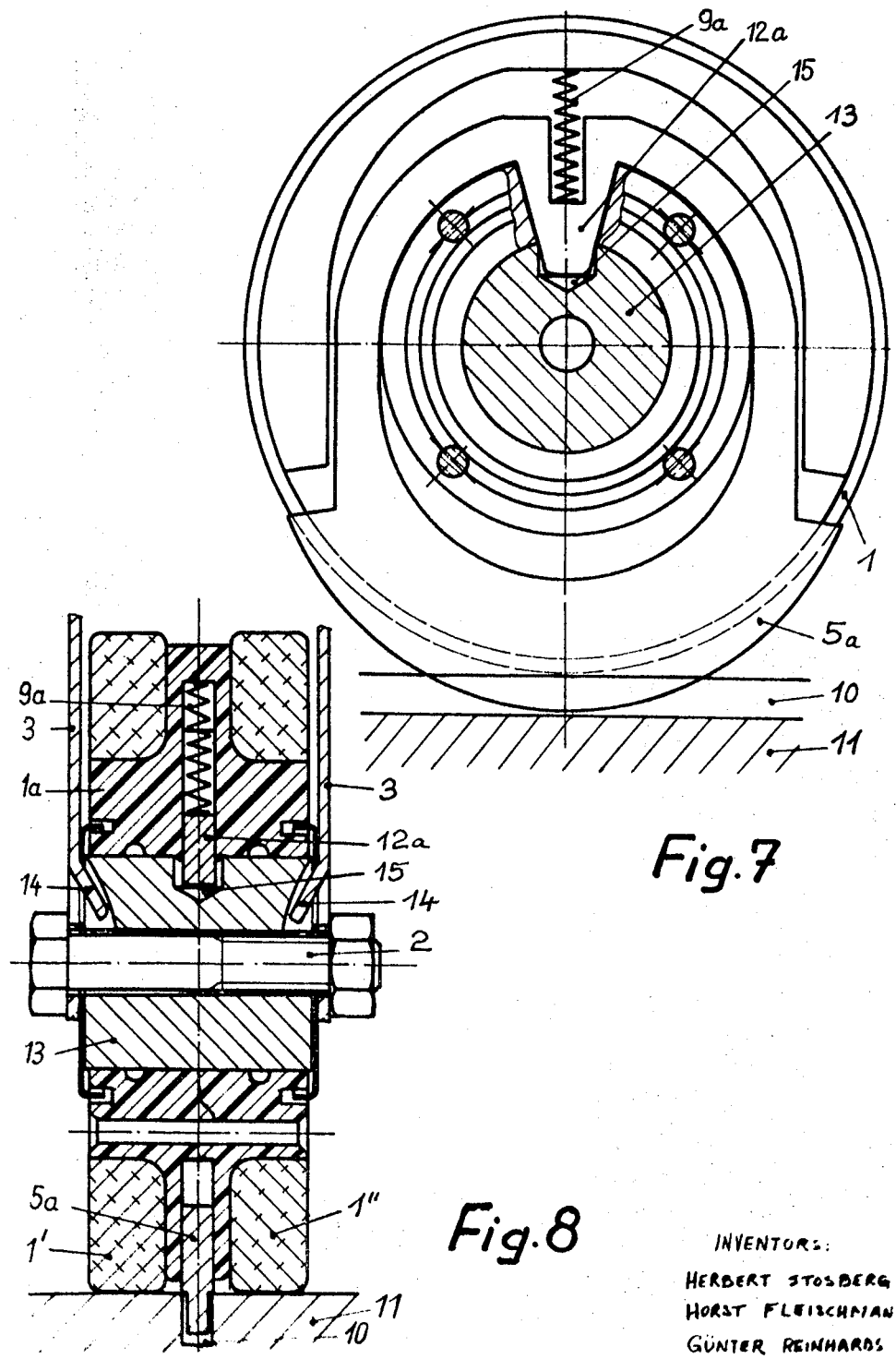

FIG. 3 is a view corresponding to FIG. 1 and showing the roller secured on a grooved conveyor track, with the small ground-sensing wheel sunk in a conveyor track groove, FIG. 4 is a view corresponding to FIG. 2 and showing the securing of the running wheel by the sinking of the ground-sensing wheel in the conveyor track groove, FIG. 5 shows in parallel section the arrangement of a roller with a pair of running wheels and a sensing member arranged between the wheels, which member comprises a follower disc, the roller being shown travelling over flat ground, FIG. 6 is a vertical section through the pair of running wheels shown in FIG. 5 and illustrates their constructional arrangement, FIG. 7 is a view corresponding to FIG. 5 and shows the roller secured on a grooved conveyor track groove, and FIG. 8 is a view corresponding to FIG. 6 and showing the securing of the running wheel by means of the vertically movable follower disc sinking into the conveyor track groove.

In the case of the embodiments shown, the rollers have smooth, nongrooved rubber-tired running wheels.

According to FIGS. 1 to 4 a running wheel 1 is supported in a usual manner in a running wheel fork 3 by means of a screw serving as the running wheel axis 2. On one side of the running wheel 1 there is an ordinary string guard disc 4 and on the other side there is a disc-shaped sensing member 5, which is arranged laterally to the running wheel 1 and is vertically movable on the running wheel axis 2. In order to prevent the sensing member 5 from rotating about the axis 2 with the running wheel 1, it has as a lock against rotation a pin-type check member 6 cooperating with the running wheel fork, which check member engages in a vertically movable fashion in a hole 7 in the running wheel fork 3. Carried at the lower end of the sensing member is a small disc-type wheel 8 which acts as a ground-sensing element and travels near and with the running wheel 1 along the ground. The sensing member 5 is formed as a solid disc, so that it is kept constantly with its ground-sensing wheel 8 in contact with the ground by its own weight, which is further assisted by an upper spring 9. In this way the sensing member 5 or its small sensing wheel 8 travelling with it along the ground is continually urged to move in vertically downward direction beyond the periphery of the running wheel 1.

When the roller passes from the flat ground onto a ribbed or groove conveyor track, then the wide rubber-tired running wheel 1 at first rolls unhindered over the ribs, until the small follower wheel 8 acting as a ground-sensing element sinks into a groove 10 of the conveyor track 11, this being assisted by the considerable deadweight of the disc-shaped sensing member 5 and the compression spring 9. On account of the vertical movement of the sensing member 5 associated with this, a catch lug 12 provided on the sensing member 5 comes into contact with a hub 1a of the running wheel 1, which in this embodiment is formed with an apertured rim 1b and the catch lug 12 engages in one or other of the apertures (FIGS. 3 and 4). Instead of this, teeth or a similar catch arrangement can also be arranged on the running wheel 1. By means of the engagement of the catch lug 12, the running wheel 1 is stopped from travelling, so that the inherently movable appliance is securely held on the grooved or ribbed conveyor track 11. Only when at the end of the conveying track the small grounding-sensing wheel 8 runs up against a deflector ridge of the conveyor track and is lifted out of the groove 10 by a chaser tooth engaging in the groove 10, does the catch lug 12 release the running wheel again, whereby the running wheel 1 is once more able to move and the roller can roll over the now flat floor.

In the embodiment shown in FIGS. 5 to 8 the hub 1a, consisting here of polyamide or another plastics material, is divided into two pieces and is provided with double rubber tires. Between the two wheels 1' and 1" of the double running wheels is arranged a vertically movable disc 5a as a sensing member, which disc is constantly pressed in the direction of the running wheel axis 1 by a spring 9a. The radially movable disc 5a has a locking cam 12a pointing towards the center, which cam, in this embodiment, also accommodates the compression spring 9a (FIG. 5). The disc 5a acts as a sensing member and rotates with the double running wheels 1', 1", whereby the locking cam 12a rides over the periphery of a bearing sleeve 13, which is situated on the running wheel axis 2 and is locked against rotation by means of lateral tongues 14 of the running wheel fork 3. At its upper vertex the bearing sleeve 13 has a bore 15 which can accommodate the locking cam 12a of the sensing disc 5a.

When the roller rolls along flat ground with its running wheel 1', 1", the sensing disc 5a cannot project beyond the periphery of the running wheel tire, because in the vertical position of the sensing disc 5a (FIG. 5) the then vertically movable disc 5a is brought into contact with the flat floor by its own weight and by the compression spring 9a, although in this position the disc 5a registers its locking cam 12a with the locking bore 15 and in this way would be capable of a downward movement. In all other positions during the rotation of the running wheel 1', 1" the cam 12a is guided on the peripheral surface of the bearing sleeve 13 and in this way the sensing disc 5a is prevented from radial displacement. The sensing disc 5a can thus project over the periphery of the running wheel 1', 1" only to the small extent, which is given by the necessary play between the locking cam 12a and the periphery of the bearing sleeve 13. In order to prevent knocking noises during rotation on flat ground, when the sensing disc again approaches its vertical position, the disc is widened at the periphery of the running wheel, so that it is already guided by the floor, before it reaches its vertical position, in which it is free to move against the floor.

When however the roller passes from the flat ground on to a ribbed or grooved conveyor track, then the wide rubber tired double running wheels 1', 1" at first rolls unhindered over the ribs, until the disc 5a acting as a sensing member reaches its vertical position, in which it is free to move downwards. In this position the sensing disc 5a sinks by its own weight and by the pressure of the now upper spring 9a into a groove 10 of the conveyor track 11. In this way the locking cam 12a associated with the disc 5a can now sink into the bore 15, registering in this position, of the bearing sleeve 13 locked against rotation (FIGS. 7 and 8). By means of the engagement of the cam 12a in the bore 15 the running wheel 1', 1" is now stopped from travelling, so that the inherently movable appliance is securely held on the grooved or ribbed conveyor track 11. Only when, at the end of the conveying track, the sensing disc 5a is run up against the deflector ridge of the conveyor track situated there and is again lifted out by the chaser tooth engaging in the groove 10, does the locking cam 12a leave the securing bore 15, whereby the running wheel 1', 1" is again free. Now the running wheel 1', 1" is once more able to travel and the roller will roll over the flat floor.

We claim:

1. A roller assembly, preferably a caster, for the entrainment or conveyance of movable appliances on ribbed or grooved conveyor tracks, in particular for shopping trolleys in self-service stores, which roller comprises a housing structure with at least one load-bearing running wheel rotatable on an axis in said housing structure to bear the load resting on the roller, securing means able to lock said load-bearing running wheel in relation to said housing structure against turning, which roller assembly comprises at least one sensing member operatively connected with said load-bearing running wheel through said securing means which is vertically movable in relation to said running wheel and which is downwardly biased to be constantly in contact with the supporting surface upon which the roller is supported, means to allow said sensing member to sink below the lowermost periphery of said load-bearing running wheel, and, if the roller contacts a groove of said conveyor track, for lowering such into said groove, and engaging means responsive to said vertical movement of said sensing member and, responsive to said lowering of said member, to actuate said securing means to stop said load-bearing running wheel from turning upon meeting the surface of said conveyor track.

2. A roller, preferably a caster, as claimed in claim 1, wherein the sensing member is arranged laterally to the running wheel.

3 A roller, preferably a caster, as claimed in claim 1 wherein there are two running wheels and wherein the sensing member is arranged between the two wheels.

4. A roller, preferably a caster, as claimed in claim 1 including a form supporting said running wheel and wherein said sensing member is arranged vertically movable on the running wheel fork.

5. A roller, preferably a caster, as claimed in claim 1, including an axle upon which said running wheel is mounted and wherein said sensing member is arranged vertically movable on said running wheel axle.

6. A roller, preferably a caster, as claimed in claim 1, wherein the sensing member has, as a means to lock such against rotation thereof, a check member cooperating with a running wheel fork, or cooperating with a check member of said running wheel fork.

7. A roller, preferably a caster, as claimed in claim 1, wherein the sensing member has a catch lug or the like, which, during said lowering of the sensing member, engages in an apertured rim or in teeth on the running wheel.

8. A roller, preferably a caster, as claimed in claim 1, wherein the sensing member has a ground-sensing element comprising a small wheel travelling in contact with the supporting surface, which small wheel is arranged to lower into the groove of the conveyor track.

9. A roller, preferably a caster as claimed in claim 5, characterized in that the sensing member consists of a vertically movable follower disc having a locking cam, which cam, when the disc lowers into the groove of the conveyor track, in turn engages lockingly in a bore or slot of the running wheel axle and locks such against rotation.

10. A roller, preferably a caster, as claimed in claim 9, characterized in that the follower disc is constantly pressed downward by a spring.

11. A roller as claimed in claim 1 including means for forcing said sensing member into constant contact with said supporting surface which forcing means lowers said sensing member into the groove of said conveyor track.

12. A roller as claimed in claim 11 wherein said means for maintaining said sensing member in contact with said surface is a compression spring.

13. A roller as claimed in claim 11 wherein said means for maintaining said sensing member in contact with said surface is a deadweight.

14. A roller as claimed in claim 5 wherein said sensing member consists of a vertically movable follower disc having a locking cam, which cam, when the disc lowers into the groove of the conveyor track, in turn engages lockingly in a bore or slot of a bearing sleeve for an axle of said running wheel whereby locking the running wheel against rotation.